United States Patent
Jia et al.

(10) Patent No.: US 9,158,707 B2
(45) Date of Patent: *Oct. 13, 2015

(54) STATISTICAL CACHE PROMOTION

(71) Applicant: Facebook, Inc., Menlo Park, CA (US)

(72) Inventors: Hongzhong Jia, Cupertino, CA (US); Xiaojun Liang, San Jose, CA (US); Jason Taylor, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,539

(22) Filed: Sep. 18, 2014

(65) Prior Publication Data

US 2015/0081974 A1 Mar. 19, 2015

Related U.S. Application Data

(63) Continuation of application No. 13/602,639, filed on Sep. 4, 2012, now Pat. No. 8,868,841.

(51) Int. Cl.
*G06F 12/00* (2006.01)
*G06F 12/12* (2006.01)
*G06F 12/08* (2006.01)
*G06F 13/00* (2006.01)

(52) U.S. Cl.
CPC .......... *G06F 12/122* (2013.01); *G06F 12/0888* (2013.01); *G06F 12/0897* (2013.01); *G06F 2212/283* (2013.01); *G06F 2212/69* (2013.01)

(58) Field of Classification Search
CPC ....... G06F 12/00; G06F 12/12; G06F 12/122; G06F 12/123
USPC .................. 711/100, 117, 118, 133, 154, 200
See application file for complete search history.

(56) References Cited

U.S. PATENT DOCUMENTS 5,845,106 A * 12/1998 Stapleton ........................ 703/21
2010/0067356 A1* 3/2010 Fujii et al. ................ 369/112.24

* cited by examiner

*Primary Examiner* — Tuan Thai
(74) *Attorney, Agent, or Firm* — Van Pelt, Yi & James LLP

(57) ABSTRACT

Storing data in a cache is disclosed. It is determined that a data record is not stored in a cache. A random value is generated using a threshold value. It is determined whether to store the data record in the cache based at least in part on the generated random value.

20 Claims, 4 Drawing Sheets

STATISTICAL CACHE PROMOTION

CROSS REFERENCE TO OTHER APPLICATIONS

This application is a continuation of co-pending U.S. patent application Ser. No. 13/602,639, entitled STATISTICAL CACHE PROMOTION filed Sep. 4, 2012 which is incorporated herein by reference for all purposes.

BACKGROUND OF THE INVENTION

Caches allow data to be stored at a location that enables faster access to the data. For example, the cache may be a faster storage and/or located closer to a desired location. Often caches are smaller in size to be cost effective and efficient in performance. This requires the data stored in the cache to be a duplicate store of an original data stored elsewhere in a larger storage. If a requested data is stored in a cache, the requested data can be provided using the data in the cache. However, if the requested data is not stored in the cache, the data has to often be obtained from another slower cache and/or an original repository of the data, all of which are comparatively slower. Thus, it is desirable to serve data requests from the fastest cache as often as possible by placing in the cache data that will be likely requested in the future. One way of predicting which data might be requested from the cache is to place in the cache the data that has been utilized the most in the past. Previously, determining the most utilized data required storing a counter for each data that may be placed in the cache and iterating the counter every time an associated data is accessed. However, storing and maintaining a counter for each potentially accessed data consumes valuable storage and computing resources. Therefore there exists a need for a better way to determine which data to store in a cache.

BRIEF DESCRIPTION OF THE DRAWINGS

Various embodiments of the invention are disclosed in the following detailed description and the accompanying drawings.

DETAILED DESCRIPTION

Figure 1:
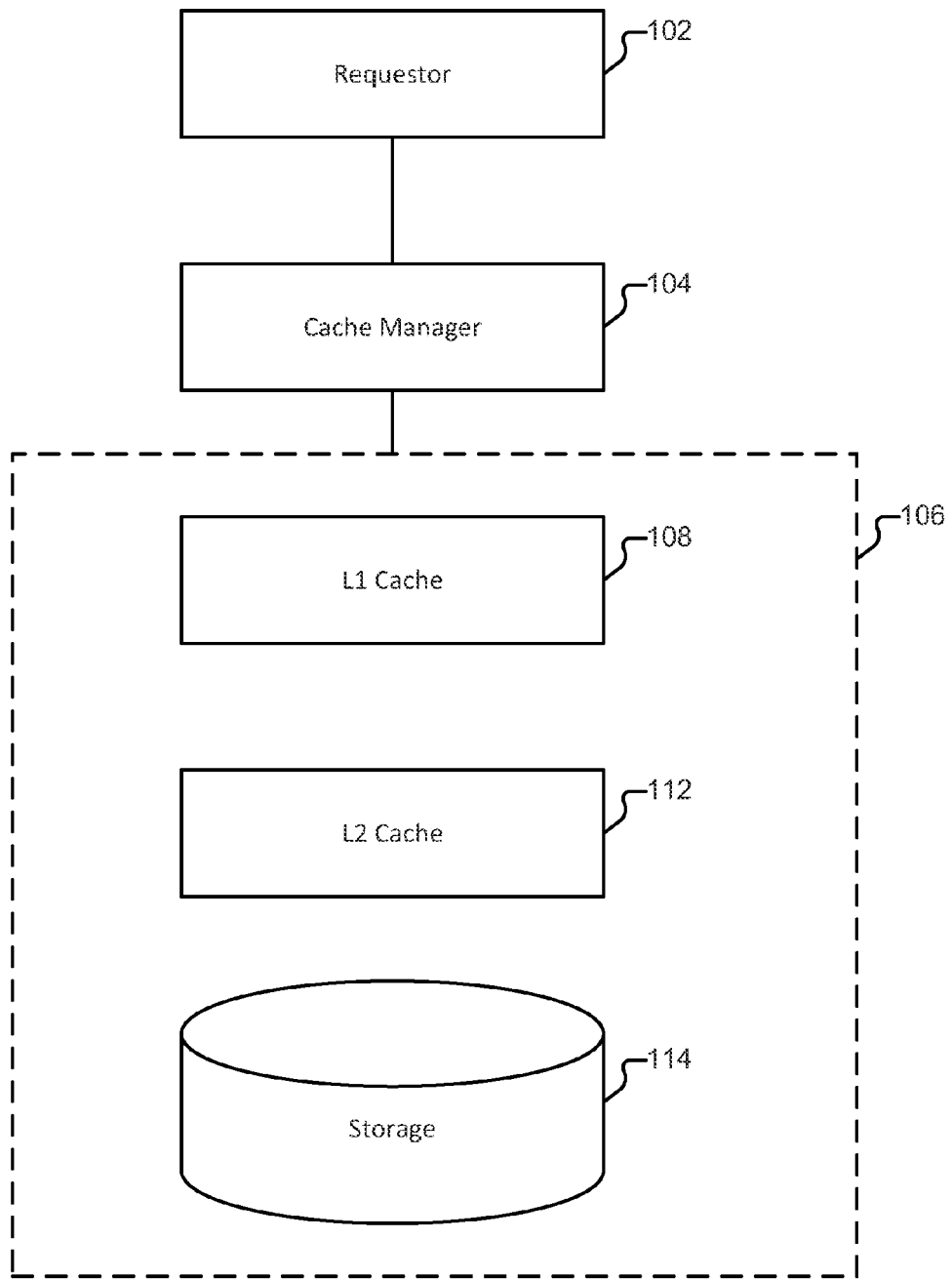
FIG. 1 is a block diagram illustrating an embodiment of a system for caching data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining whether to store a data record in a cache is disclosed. In some embodiments, the stored data record may be any type of data including a database record, a key-value pair, a file, a text, a value, an image, and any other type of data. In some embodiments, when it is determined that a requested data record is not stored in a cache, it is determined whether the requested data record should be placed in the cache to serve a future request for the data record. For the requested data record, a random value is generated using a determined and/or provided threshold value. Based at least in part on the random value, it is determined whether to store the data record in the cache. In some embodiments, if the random value and/or a calculation performed using the random value matches a predetermined value, the data record is stored in the cache. For example, the probability that the random value and/or a calculation performed using the random value matches the predetermined value approximates a desired probability that the data record should be stored in the cache each time a determination is made. In some embodiments, a frequently accessed data record will have a higher probability of being placed in the cache than an infrequently accessed data record because each time a data record that is not stored in the cache is requested, another probabilistic determination is made on whether to store the data record in the cache. Each time an additional probabilistic determination is made on whether to store the data record in the cache, the overall probability that the data record will be stored in the cache increases. In some embodiments, the threshold value that is used to determine the random value controls the likelihood the data record will be stored in the cache. The threshold value may be determined dynamically and/or predetermined based on an observed data access pattern. In some embodiments, the threshold value is determined based at least in part on a size and/or hierarchy level of a cache of interest.

FIG. 1 is a block diagram illustrating an embodiment of a system for caching data. Requestor 102 requests a data record from cache manager 104. Examples of requestor 102 include any hardware or software system, component, process, and/or application. Cache manager 104 manages storage grouping 106. Cache manager 104 may include one or more hardware or software systems, components, processes, and/or applications. In some embodiments, managing storage grouping 106 includes obtaining, reading, storing, writing, removing, deleting, and/or replacing data in storage grouping 106. Storage grouping 106 includes L1 cache 108, L2 cache 112 and storage 114. The components included in storage grouping 106 may be included in one or more physically separate systems. For example, L1 cache 108 and L2 cache 112 may be included in different physical systems. An example of storage grouping 106 has been shown in FIG. 1 to illustrate an example of at least a portion of caches and storages that may contain a data requested by requested by requestor 102 and/or components at least in part managed by cache manager 104. In the example shown, L1 cache 108 is the first cache level, L2 cache 112 is the second cache level, and storage 114 is the backing repository that contains the potential data that may be stored in the caches. For example, when a data is requested by requestor 102, cache manager 104 first checks L1 cache 108 to determine whether the requested data is stored in L1 cache 108. If the requested data is stored in L1 cache 108, the requested data is provided from L1 cache 108. If the requested data is not stored in L1 cache 108, cache manager checks L2 cache 112 to determine whether the requested data is stored in the L2 cache. If the requested data is not stored in L2 cache 112, the requested data is obtained from storage 114 and provided to the requestor. In some embodiments, whenever a requested data is determined to be not stored in cache, cache manager 104 determines whether the requested data should be stored in the cache to serve a future request. In some embodiments, cache manager 104 determines which requested data must be cached and which requested data is not required to be cached. For example, cache manager 104 is configured to cache all requested data of a predetermined type, and if the requested data is not of the predetermined type, cache manager 104 makes a probabilistic determination on whether to cache the request data.

In various embodiments, other levels of caches may exist. For example, cache level(s) above L1 cache 108 and/or cache level(s) below L2 cache 112 may exist. These additional cache levels may be managed by cache manager 104 and/or another cache manager. In some embodiments, L1 cache 108 is associated with a faster performance (e.g., access time, transfer rate, write/read speed, etc.) as compared to L2 cache 112. In some embodiments, L2 cache 112 is associated with a faster performance as compared to storage 114. In some embodiments, L1 cache 108 is smaller in size as compared to the size of L2 cache 112. In some embodiments, L2 cache 112 is smaller in size as compared to the size of storage 114. Examples of storage 114 include a database, a production storage, a backup storage, a physical disk, a flash storage, a memory, a hard driver, a storage media, and/or any medium for storing data. Examples of L1 cache 108 and/or L2 cache 112 include a memory, a flash storage, a processor cache, and any other medium for storing data.

In various embodiments, the components shown in FIG. 1 may exist in various combinations of hardware machines. One or more of the components shown in FIG. 1 may be included in the same machine. For example, cache manager 104 and storage group 106 may be included in the same server. In the example shown in FIG. 1, portions of the communication path between the components are shown. Other communication paths may exist and the example of FIG. 1 has been simplified to illustrate the example clearly. The components of FIG. 1 may communicate with another component via a network. Examples of the network include one or more of the following: a direct or indirect physical communication connection, mobile communication network, Internet, intranet, Local Area Network, Wide Area Network, Storage Area Network, and any other form of connecting two or more systems, components, or storage devices together. Although single instances of components have been shown to simplify the diagram, additional instances of any of the components shown in FIG. 1 may exist. For example, additional instances of L1 cache and/or L2 cache that store data in storage 114 may exist. These additional caches may be managed by cache manager 104 and/or a different cache manager in a system different from a system containing cache manager 104. For example, cache manager 104 is included in a first system that includes L1 cache 108 and a second system that includes another cache manager and another L1 cache that are a part of the caching hierarchically associated with the same L2 cache 112 and storage 114. Components not shown in FIG. 1 may also exist.

Figure 2:
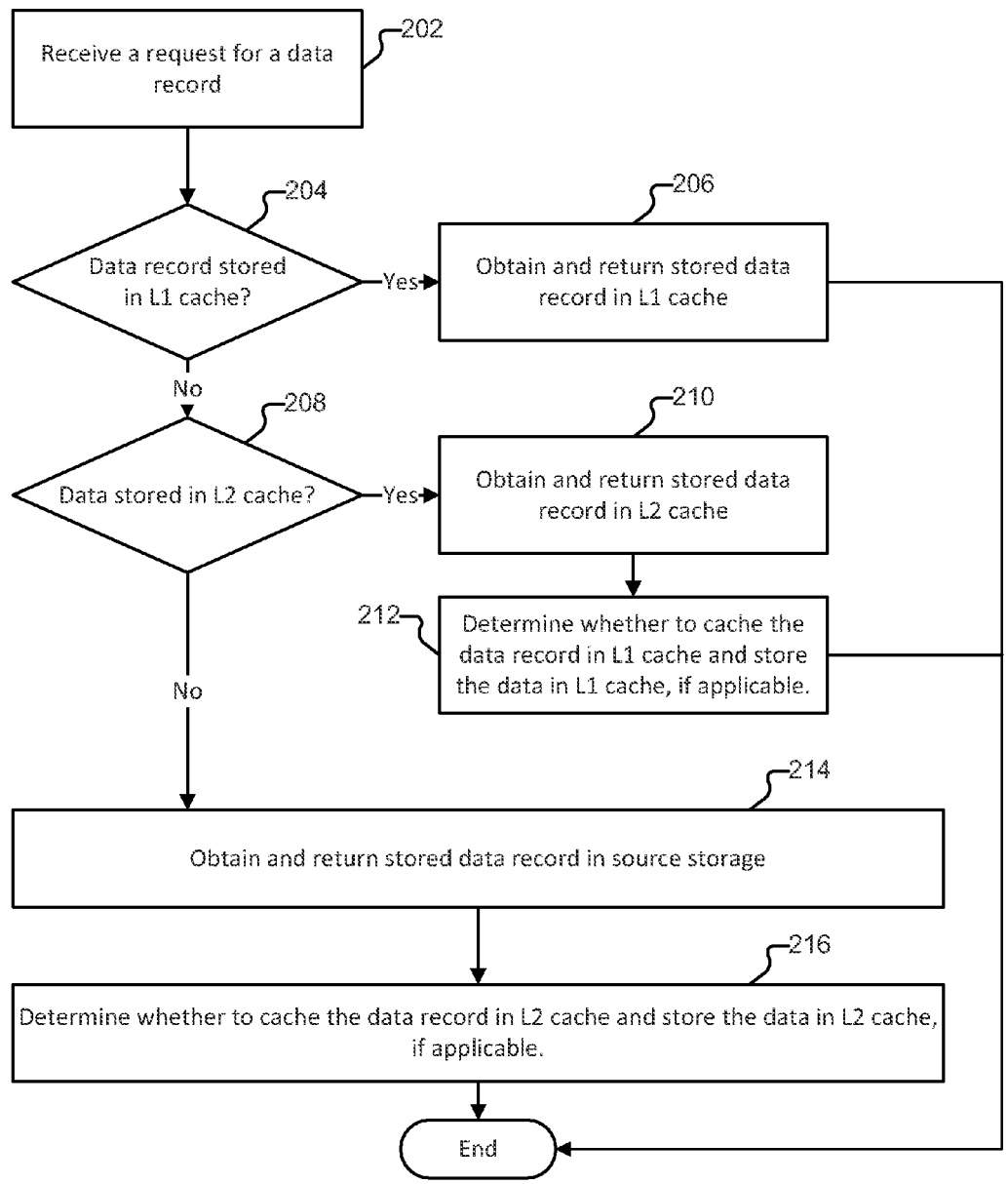
FIG. 2 is a flow chart illustrating an embodiment of a process for processing a request for a data record.

FIG. 2 is a flow chart illustrating an embodiment of a process for processing a request for a data record. In some embodiments, the process of FIG. 2 is implemented in cache manager 104 of FIG. 1.

At 202, a request for a data record is received. In some embodiments, the request is received from a requestor such as requestor 102 of FIG. 1. The requested data record may be any type of data including a database record, a key-value pair, a file, a text, a value, an image, and any other type of data.

At 204, it is determined whether the requested data record is stored in an L1 cache. In some embodiments, the L1 cache is included in L1 cache 108 of FIG. 1. If at 204 it is determined that the requested data record is stored in the L1 cache, at 206, the requested data record stored in the L1 cache is obtained from the L1 cache and returned to the requester. If at 204 it is determined that the requested data record is not stored in the L1 cache, at 208, it is determined whether the requested data record is stored in an L2 cache. In some embodiments, the L2 cache is included in L2 cache 112 of FIG. 1.

If at 208 it is determined that the requested data record is stored in the L2 cache, at 210, the requested data record stored in the L2 cache is obtained from the L2 cache and returned to the requester.

At 212, it is determined whether to cache/store the requested data record in the L1 cache and the requested data record is cached in the L1 cache, if applicable. In some embodiments, determining whether to cache the data record includes determining a random value used to make a probabilistic determination on whether to store the requested data record in the L1 cache. In some embodiments, caching the data record in the L1 cache includes evicting/removing/replacing a previously stored data record in the L1 cache. In various embodiments, the previously stored data record is selected based on a time/order indicator (e.g., associated with when the data record has been last accessed and/or placed in the cache), a least recently used (LRU) order, last-in-first-out order (LIFO), first-in-first-out order (FIFO), and/or a random order.

If at 208 it is determined that the requested data record is not stored in the L2 cache, at 214, the requested data record is obtained from a source storage and returned to the requester. In some embodiments, the source storage is included in storage 114 of FIG. 1. In other embodiments, one or more other levels of cache or other cache may exist and these cache(s) are checked before the requested data is obtained from the source storage.

At 216, it is determined whether to cache/store the requested data record in the L2 cache and the requested data record is cached in the L2 cache, if applicable. In some embodiments, determining whether to cache the data record includes determining a random value used to make a probabilistic determination on whether to store the requested data record in the L2 cache. In some embodiments, caching the data record in the L2 cache includes evicting/removing/replacing a previously stored data record in the L2 cache. In various embodiments, the previously stored data record is selected based on a time indicator (e.g., associated with when the data record has been last accessed and/or placed in the cache), least recently used (LRU), last-in-first-out order (LIFO), first-in-first-out order (FIFO), and/or a random order. In some embodiments, at 216, it is also determined whether to cache/store the requested data record in the L1 cache and the requested data record is cached in the L1 cache, if applicable.

Figure 3:
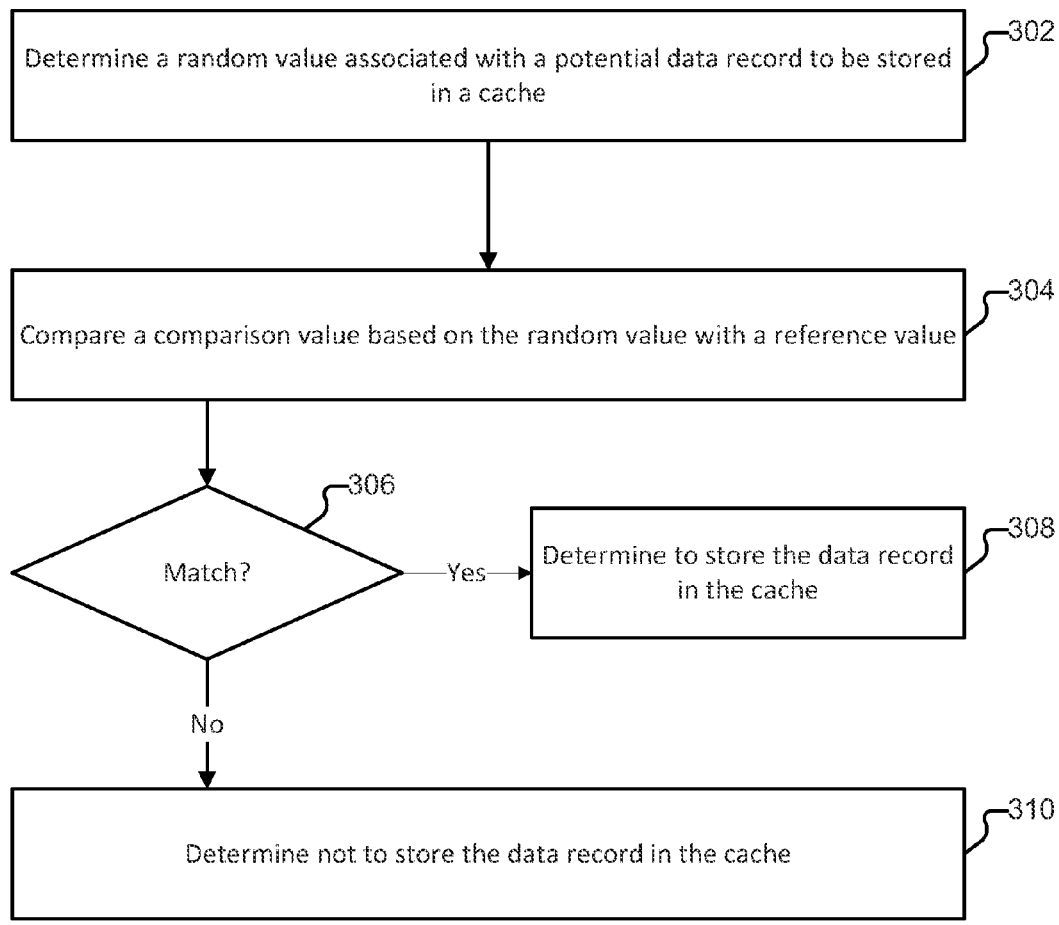
FIG. 3 is a flow chart illustrating an embodiment of a process for determining whether to cache a data record in a cache storage.

FIG. 3 is a flow chart illustrating an embodiment of a process for determining whether to cache a data record in a cache storage. In some embodiments, the process of FIG. 3 is implemented in cache manager 104 of FIG. 1. In some embodiments, the process of FIG. 3 is included in step 212 and/or 216 of FIG. 2.

At 302, a random value associated with a potential data record to be stored in a cache is determined. In some embodiments, the cache includes L1 cache 108 of FIG. 1. In some embodiments, the cache includes L2 cache 112 of FIG. 1. In some embodiments, determining the random value includes determining a random value bound by a predetermined threshold value. For example, a random integer value between 1 and a threshold value is determined. In some embodiments, the random value is associated with a statistical probability the data record should be stored in the cache each time it is determined that the data record has been requested but not stored in the cache. The threshold value may be configured to adjust the statistical probability that the data record will be stored in the cache. In some embodiments, the threshold value is predetermined. In some embodiments, the threshold value is dynamically determined. In some embodiments, the threshold value is determined based at least in part on an analysis of a historical access pattern of one or more data records in a data set. For example, number of accesses for each data record in the data set is determined and used to determine the threshold value. In some embodiments, the random value and/or threshold value is based at least in part on a storage size and/or hierarchy level of the cache. In some embodiments, the random value must be an integer value. In some embodiments, the threshold value is based at least in part on a probabilistic function to be used for a particular cache. For example, each cache level of a plurality of cache levels is associated with a different probabilistic function used to determine whether to cache the data record in the particular cache level, and the probabilistic function for each cache level is associated with a different threshold value.

At 304, a comparison value based on the random value is compared with a reference value. In some embodiments, the comparison value is the random value. In some embodiments, the comparison value is computed using the random value. For example, the comparison value is the random value modulo the threshold value. In some embodiments, the reference value is a predetermined value that represents the value of the comparison value if the data record should be stored in the cache. In some embodiments, performing the comparison includes determining whether the comparison value equals the reference value. Other comparisons such as greater than, less than, greater than or equal to, or less than or equal to comparisons may be performed. In some embodiments, the statistical probability that the comparison value is of a certain comparison (e.g., equal to) as compared to the reference value is associated with the probability that the data record of interest should be stored in the cache. For example, the random value must be an integer value between 1 and a threshold value, and if the comparison value (e.g., the random value modulo the threshold value) equals the reference value (e.g., integer value of 1), the data record of interest is to be stored in the cache. Otherwise, the data record of interest is not yet to be stored in the cache.

At 306, if it is determined that a result of the comparison matches a criteria, at 308, it is determined to store the data record of interest in the cache. In some embodiments, matching the criteria includes determining whether in step 304 the comparison value matches a reference value. In some embodiments, storing the data record in the cache includes replacing and/or removing an existing data record stored in the cache. The existing data record to be replaced/removed may be selected based on a time indicator (e.g., associated with when the data record has been last accessed and/or placed in the cache), least recently used (LRU), last-in-first-out order (LIFO), first-in-first-out order (FIFO), and/or a random order.

At 306, if it is determined that a result of the comparison does not match a criteria, at 310, it is determined not to store the data record of interest in the cache. In some embodiments, the criteria does not match because in step 304 the comparison value does not match a reference value.

Figure 4:
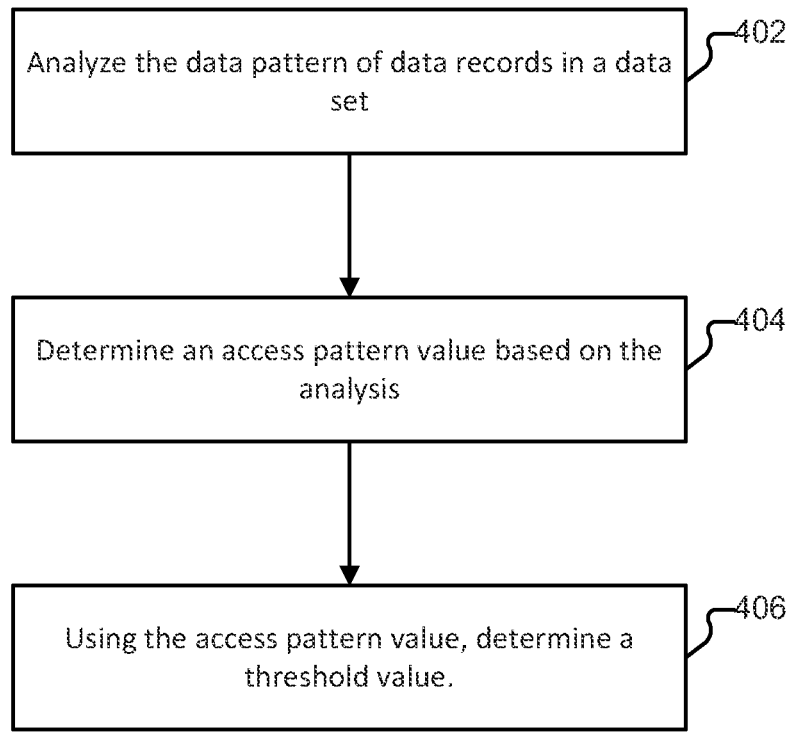
FIG. 4 is a flow chart illustrating an embodiment of a process for determining a threshold value.

FIG. 4 is a flow chart illustrating an embodiment of a process for determining a threshold value. In some embodiments, the process of FIG. 4 is implemented in cache manager 104 of FIG. 1. In some embodiments, the process of FIG. 4 is included in step 212 and/or 216 of FIG. 2. In some embodiments, the process of FIG. 4 is included in step 302 of FIG. 3.

At 402, a data pattern of data records in a data set is analyzed. In some embodiments, analyzing the data pattern includes obtaining/tracking a data access pattern. For example, for a predetermined period of time, the number of times each record in a data set is accessed is tracked. In some embodiments, by tracking the data pattern of a data set for a limited period of time, an appropriate threshold value can be determined for the data set and a data access pattern. In some embodiments, analyzing the data set includes organizing, sorting, and/or processing the data pattern. In some embodiments, the total number of unique data records that were accessed a given number of times or less is determined. For example, it is determined that 90% of unique data records are accessed for no more than 32 times per day. In some embodiments, the total number of data record accesses for data record(s) that were accessed a given number of times or less is determined. For example, it is determined that 79% of accesses are from the data records which are accessed for more than 32 times per day. In some embodiments, performing analysis includes generating a graph or other visualization of the data record access pattern that can be used to determine an access pattern value.

At 404, an access pattern value is determined based on the analysis. In some embodiments, determining the access pattern value includes determining a value that represents a desired average number of times the data record has been accessed and not stored in the cache during a given amount of time before the data record is stored in a given level of cache. For example, 32 is selected as the access pattern value because the analysis performed in step 402 determined that 90% of unique data records are accessed for no more than 32 times per day and that 79% of accesses are from the data records which are accessed for more than 32 times per day. In some embodiments, a plurality of access pattern values may be determined. In some embodiments, determining the access pattern value includes determining a value that represents a number of accesses during a given amount of time associated with a data record that should be stored in a given level of cache with a relatively low degree of probability. In some embodiments, determining the access pattern value includes determining a value that represents a number of accesses during a given amount of time associated with a data record that should be stored in a given level of cache with a relatively higher degree of probability. For example, it is determined that when the number of accesses of a given data record is 10, the probability the data record is stored in a certain cache should be relatively low (e.g., less than 30%), when the number of accesses of the given data record is 32, the probability the data record is stored in a certain cache should be relatively high (e.g., around 60%), and when the number of accesses of the given data record is 100, the probability the data record is stored in a certain cache should be relatively very high (e.g., greater than 90%). In various embodiments, the access pattern value is determined using various probability density functions. For example, the access pattern value is determined using a binomial density function and/or another density function.

At 406, using the access pattern value, a threshold value is determined. In some embodiments, the determined threshold value is the threshold value used in step 212 and/or 216 of FIG. 2 and/or step 302 of FIG. 3. For example, for each access of a data record that is not stored in a given cache, the data record is stored in the given cache if a randomly generated integer between 1 and the threshold value (i.e., N) modulo N equals to 1. This gives the probability of 1/N a data record is stored in the given cache and (N−1)/N probability the data record is not stored in the cache. As a data record is accessed more often, it has a greater chance to be promoted because the probabilistic determination of whether to store the data record in the cache is performed each time the data record is accessed but not stored in the cache. The calculation below shows the probability a data record will stored in the cache.

Given:
P(S=k) is the probability a data record is stored in a given cache when it gets accessed at $k_{th}$ time.
P(F=k) is the probability a data record is not stored in a given cache when it gets accessed at $k_{th}$ time.
The probability for each individual trial:

$$P_s = \frac{1}{N}, P_f = \frac{N-1}{N}$$

where $P_s$ is the success probability and $P_f$ is the failure probality $$P(S = k) = P(F = k-1) * P_s =$$
$$\frac{1}{N} * P_f * P(F = k-2) = \frac{1}{N} * (P_f)^{k-1} = \frac{1}{N} * \left(\frac{N-1}{N}\right)^{k-1}$$

The cumulative probability:

$$P(S \leq k) = P(S = 1) + P(S = 2) + \ldots + P(S = k) =$$
$$\frac{1}{N} + \frac{1}{N} * \frac{N-1}{N} + \frac{1}{N} * \left(\frac{N-1}{N}\right)^2 + \ldots + \frac{1}{N} * \left(\frac{N-1}{N}\right)^{k-1} =$$
$$\frac{\frac{1}{N} * \left(1 - \left(\frac{N-1}{N}\right)^{k-1}\right)}{1 - \left(\frac{N-1}{N}\right)} = 1 - \left(\frac{N-1}{N}\right)^{k-1}$$

For example, the access pattern values of 10, 32, and 100 have been determined because it is determined that when the number of accesses of a given data record is 10, the probability the data record is stored in a certain cache should be relatively low (e.g., less than 30%), when the number of accesses of the given data record is 32, the probability the data record is stored in a certain cache should be relatively high (e.g., around 60%), and when the number of accesses of the given data record is 100, the probability the data record is stored in a certain cache should be relatively very high (e.g., greater than 90%). Using these access pattern values and associated criteria, a threshold value of 32 (i.e., N=32) has been determined. Using the earlier calculated probability formula:

$$P(S \leq 10) = 1 - \left(\frac{32-1}{32}\right)^{10-1} = 24.85\%$$

$$P(S \leq 32) = 1 - \left(\frac{32-1}{32}\right)^{32-1} = 62.63\%$$

$$P(S \leq 100) = 1 - \left(\frac{32-1}{32}\right)^{100-1} = 95.69\%$$

This means that a data record has 24.85% probability to be stored in a cache with 10 accesses, 62.63% probability to be stored in the cache with 32 accesses and 95.69% probability to be stored in the cache with 100 accesses. These values are merely an example. Other access pattern values and associated desired cache storage probability may be used. In some embodiments, the threshold value may be determined at least in part based on a size and/or hierarchy level of the cache. For example, a lower probability of being stored in the cache is associated with a smaller and/or higher level cache (e.g., L1 cache) as compared to a larger and/or lower level cache (e.g., L2 cache).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for storing data in a cache, comprising:
a processor configured to:
determine that a data record is not stored in a cache;
generate a first random value using a threshold value;
determine whether to store the data record in the cache based at least in part on the generated first random value;
generate a second random value using the threshold value; and
determine whether to store the data record in the cache based at least in part on the generated second random value; and
a memory coupled to the processor and configured to provide the processor with instructions.

2. The system of claim 1, wherein the threshold value is associated with a desired probability that the data record will be stored in the cache.

3. The system of claim 2, wherein the desired probability is associated with an inverse value of the threshold value.

4. The system of claim 1, wherein the threshold value has been determined based at least in part on an observed data access pattern of a data set that includes the data record.

5. The system of claim 1, wherein the threshold value has been determined based at least in part on a data pattern value that represents a desired average number of times the data record is accessed and not stored in the cache before the data record is stored in the cache.

6. The system of claim 1, wherein the threshold value has been determined based at least in part on a size of the cache.

7. The system of claim 1, wherein the threshold value has been determined based at least in part on a hierarchy level of the cache.

8. The system of claim 1, wherein in the event it is determined to store the data record in the cache, the processor is further configured to select an existing data record stored in the cache to be replaced with the data record to be stored in the cache.

9. The system of claim 1, wherein generating the first random value is associated with a probabilistic determination on whether to store the data record in the cache.

10. The system of claim 1, wherein determining whether to store the data record in the cache based at least in part on the generated first random value includes comparing the first random value with a reference value.

11. The system of claim 1, wherein determining whether to store the data record in the cache based at least in part on the generated second random value includes comparing a reference value with a result of the second random value modulo the threshold value.

12. The system of claim 11, wherein it is determined to store the data record in the cache based at least in part on the generated second random value if the result matches the reference value.

13. A method of storing data in a cache, comprising:
   determining that a data record is not stored in a cache;
   generating a first random value using a threshold value;
   determining whether to store the data record in the cache based at least in part on the generated first random value;
   generating a second random value using the threshold value; and
   determining whether to store the data record in the cache based at least in part on the generated second random value.

14. The method of claim 13, wherein the threshold value is associated with a desired probability that the data record will be stored in the cache.

15. The method of claim 14, wherein the desired probability is associated with an inverse value of the threshold value.

16. The method of claim 13, wherein determining whether to store the data record in the cache based at least in part on the generated first random value includes comparing the first random value with a reference value.

17. The method of claim 13, wherein the threshold value has been determined based at least in part on a data pattern value that represents a desired average number of times the data record is accessed and not stored in the cache before the data record is stored in the cache.

18. A computer program product for storing data in a cache, the computer program product being embodied in a non-transitory computer readable storage medium and comprising computer instructions for:
   determining that a data record is not stored in a cache;
   generating a first random value using a threshold value;
   determining whether to store the data record in the cache based at least in part on the generated first random value;
   generating a second random value using the threshold value; and
   determining whether to store the data record in the cache based at least in part on the generated second random value.

19. The computer program product of claim 18, wherein the threshold value is associated with a desired probability that the data record will be stored in the cache.

20. The computer program product of claim 19, wherein the desired probability is associated with an inverse value of the threshold value.

* * * * *